A. C. STEWART.
AUXILIARY AIR VALVE FOR CARBURETERS.
APPLICATION FILED AUG. 16, 1911.

1,026,533. Patented May 14, 1912.

Witnesses:

Inventor,
Alfred C. Stewart

UNITED STATES PATENT OFFICE.

ALFRED C. STEWART, OF LOS ANGELES, CALIFORNIA.

AUXILIARY AIR-VALVE FOR CARBURETERS.

1,026,533.

Specification of Letters Patent. Patented May 14, 1912.

Application filed August 16, 1911. Serial No. 644,448.

*To all whom it may concern:*

Be it known that I, ALFRED C. STEWART, a citizen of the United States, residing at Los Angeles, in the county of Los Angeles and State of California, have invented a new and useful Auxiliary Air-Valve for Carbureters, of which the following is a specification.

This invention relates to a valve for controlling the supply of auxiliary air between the carbureter and the intake of an internal combustion engine, and the main object of the invention is to provide a device for this purpose which is simple in construction, easy to operate, and gives an accurate regulation of the air supply.

Another object of the invention is to provide an auxiliary air valve which may be applied to the inlet pipe or manifold of engines in such manner that no extension or displacement of the carbureter or intake pipe is required.

Other objects of the invention will appear hereinafter.

Figure 1:
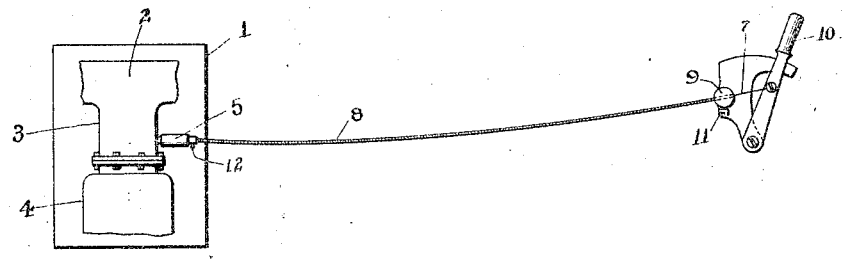
Figure 2:
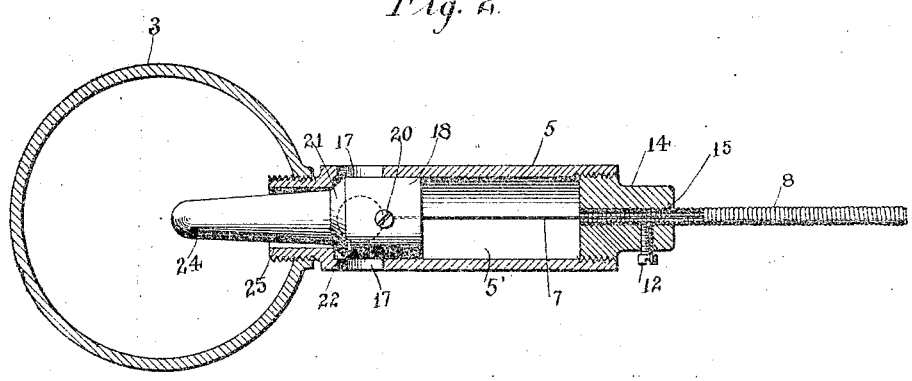

The accompanying drawings illustrate embodiments of the invention, and referring thereto: Figure 1 is a side elevation of a portion of an engine and carbureter therefor, with the auxiliary air valve and its controlling means. Fig. 2 is a horizontal section of the auxiliary air valve.

1 designates a portion of an internal combustion engine and 2 the manifold for said engine, connected by inlet pipe 3 to a carbureter indicated at 4. The auxiliary air valve is connected to said inlet pipe 3 to control admission of the auxiliary air. Said auxiliary air valve consists of a casing 5 in which is mounted a slidable valve member hereinafter described, connected to and operated by the inner or movable wire 7 of a Bowden wire whose outer flexible, tubular casing 8 is secured at one end to the casing 5 and at the other end to a support 9 located in any suitable position, and carrying a handle 10 pivotally mounted on said wire support 9 and connected to the inner wire 7 of the Bowden wire. Said Bowden wire casing 8 may be clamped to the support 9 and casing 5 by set screws 11 and 12.

The Bowden wire herein referred to is that described in patent to E. M. Bowden, No. 609,570, dated August 23rd, 1898.

The casing 5' for the auxiliary air valve 5 is cylindrical and closed at its outer end by block 14 screwed into said outer end, said block being axially perforated as at 15 to receive the casing 8 of the Bowden wire and the fastening screw 12 being screwed into said block to grip said casing of the Bowden wire. As shown in Fig. 2 the casing 5' is provided with air inlet openings 17 in its side walls and a valve body 18 is mounted to slide in the cylindrical casing 5' and connected to the inner wire 7 of the Bowden wire, said wire being extended into said body 18 and fastened by screw 20. Said body 18 is formed with a conical valve face 21 on its outer end coöperating with an annular shoulder 22 formed in the outer end of the casing 5' and said body is further provided with a conical or tapering extension 24 extending therefrom axially within a reduced cylindrical portion 25 of the valve casing, this cylindrical portion screwing into the inlet pipe 3 to secure the auxiliary air valve in place, and the space between this cylindrical portion 25 and the tapering extension 24 of the valve body serving as the controlling passage for the auxiliary air.

The operation of the invention is as follows: Normally, when the auxiliary air valve is in closed position, the conical valve face 21 rests against the shoulder 22, cutting off communication from the openings 17 to the air inlet pipe. When it is desired to open the valve, the handle 10 is operated to draw the inner wire 7 of the Bowden wire outwardly, causing the valve body 18 to move so as to separate the valve face 21 from the shoulder 22 and open communication from the outer air to inlet pipe 3, the size of the opening increasing as the valve body is drawn farther, by reason of the taper of the valve extension 24 giving a gradual enlargement of the space between said extension and the casing portion 25 as the valve is withdrawn. The valve body also moves over the opening 17 in the side of the cylindrical casing, giving a further regulating effect.

By the means above described the amount of auxiliary air admitted to the inlet pipe can be accurately and conveniently regulated.

What I claim is:

An auxiliary air valve for the inlet pipe of an internal combustion engine, comprising a cylindrical casing having a reduced portion adapted for connection to said inlet pipe and a shoulder adjacent to said reduced portion, and provided with openings in its side, a valve body slidably mounted in said cylindrical casing and movable to close or open more or less of said openings, and having a conical valve face coöperating with said shoulder of said casing, said valve body being provided with a tapered extension extending through said reduced portion of said casing, a flexible tubular casing secured to the outer end of said cylindrical casing and having a flexible wire secured to said valve body and extending through said flexible tubular casing and an operating handle connected to said flexible wire.

In testimony whereof, I have hereunto set my hand at Los Angeles, California, this 8th day of August, 1911.

ALFRED C. STEWART.

In presence of—
ARTHUR P. KNIGHT,
GLADYS RUSSELL.